US012780653B2

United States Patent

(12) United States Patent
Middaugh et al.

(10) Patent No.: US 12,780,653 B2
(45) Date of Patent: Nov. 3, 2026

(54) PROCESS AND SYSTEM FOR WATER-GAS SHIFT CONVERSION OF SYNTHESIS GAS WITH HIGH CO CONCENTRATION

(71) Applicant: Air Products and Chemicals, Inc., Allentown, PA (US)

(72) Inventors: Joshua E. Middaugh, Gilbertsville, PA (US); Shihong Yan, Sugarland, TX (US); Sonia Farrokhpanah, Surbiton (GB); Thomas Frommweiler, Tring (GB)

(73) Assignee: Air Products and Chemicals, Inc., Allentown, PA (US)

( * ) Notice: Subject to any disclaimer, the term of this patent is extended or adjusted under 35 U.S.C. 154(b) by 1051 days.

(21) Appl. No.: 17/960,854

(22) Filed: Oct. 6, 2022

(65) Prior Publication Data

US 2024/0116756 A1 Apr. 11, 2024

(51) Int. Cl.

| | |
|---|---|
| ***C01B 3/16*** | (2006.01) |
| ***B01J 12/00*** | (2006.01) |
| ***B01J 19/00*** | (2006.01) |

(52) U.S. Cl.

CPC ............... *C01B 3/16* (2013.01); *B01J 12/007* (2013.01); *B01J 19/0013* (2013.01); *B01J 2219/00058* (2013.01); *B01J 2219/00164* (2013.01); *B01J 2219/00186* (2013.01); *C01B 2203/0283* (2013.01); *C01B 2203/1047* (2013.01); *C01B 2203/1094* (2013.01)

(58) Field of Classification Search

None

See application file for complete search history.

(56) References Cited

U.S. PATENT DOCUMENTS 8,349,214 B1 * 1/2013 Kelly ..................... B01J 8/0285 423/652
8,404,156 B2 3/2013 Schiodt (Continued)

FOREIGN PATENT DOCUMENTS

| | | |
|---|---|---|
| DE | 102017201681 | 8/2018 |
| EP | 0444987 | 9/1991 |

OTHER PUBLICATIONS

Bonan Liu, et al., "Recent Advances in Industrial Sulfur Tolerant Water Gas Shift Catalysts for Syngas Hydrogen Enrichment: Application of Lean (Low) Steam/Gas Ratio", Catalysts, 2019, 1-18.

*Primary Examiner* — John J Figueroa
(74) *Attorney, Agent, or Firm* — Jason M. Ploeger

(57) ABSTRACT

A method for enriching a synthesis gas in hydrogen is presented. The method includes adding $H_2O$ to the synthesis gas to form a synthesis gas stream that includes hydrogen, carbon monoxide, and steam. The synthesis gas stream has a steam to dry gas molar ratio, S/DG; and an oxygen to carbon molar ratio, O/C. The method includes introducing the synthesis gas stream into a water-gas shift reactor and reacting the synthesis gas stream in the water-gas shift reactor in the presence of a non-iron-based catalyst to produce a shifted synthesis gas. The method further includes controlling an outlet temperature of the synthesis gas stream to remain at or below a critical temperature or to drop to or below the critical temperature by adjusting the S/DG ratio to maintain the O/C ratio below a lower O/C limit or above an upper O/C limit.

16 Claims, 5 Drawing Sheets

(56) References Cited

U.S. PATENT DOCUMENTS

| | | | | |
|---|---|---|---|---|
| 2007/0137107 | A1* | 6/2007 | Barnicki | C10K 1/20<br>48/198.3 |
| 2009/0121191 | A1* | 5/2009 | Tillman | C01B 3/16<br>423/437.1 |
| 2013/0283761 | A1 | 10/2013 | Takeuchi | |
| 2015/0376801 | A1* | 12/2015 | Bairamijamal | C25B 9/05<br>518/704 |
| 2017/0158504 | A1* | 6/2017 | Merritt, Jr. | C01B 3/48 |
| 2020/0179897 | A1 | 6/2020 | Rueger et al. | |
| 2020/0377365 | A1* | 12/2020 | Mortensen | C01B 3/384 |
| 2022/0169502 | A1* | 6/2022 | Alamro | C07C 29/1518 |
| 2023/0070799 | A1* | 3/2023 | Kelly | C01B 3/48 |

* cited by examiner

PROCESS AND SYSTEM FOR WATER-GAS SHIFT CONVERSION OF SYNTHESIS GAS WITH HIGH CO CONCENTRATION

FIELD OF THE INVENTION

The present invention relates generally to the conversion of carbon monoxide and steam in a synthesis gas to a shifted synthesis gas enriched in hydrogen, and more specifically to the conversion of synthesis gas containing elevated levels of carbon monoxide in a high-temperature water-gas shift reaction. The synthesis gas fed to the water-gas shift reaction may comprise more than 15 vol % of carbon monoxide on a dry basis.

BACKGROUND OF THE INVENTION

Historically, high-temperature shift (HTS) reactors use catalysts made from iron and chromium oxides. To avoid over-reduction of the iron in these catalysts, a minimum steam-to-dry gas (S/DG) ratio is required based on the given synthesis gas composition. The higher the reducing potential of the synthesis gas, the higher the minimum steam requirement and vice versa. The minimum steam required to avoid over-reduction of iron-based HTS catalysts is typically higher than the steam required to complete the water-gas shift (WGS) reaction to a targeted CO to $CO_2$ conversion. Therefore, more steam is used than necessary for WGS processes that employ iron-based HTS catalysts. The use of this steam in the process lowers the thermal efficiency of the plant and decreases the amount of steam available for export, all at a detriment to the overall plant economics. The limitations of iron-based catalysts are particularly acute in blue hydrogen plants, that is hydrogen plants with integrated carbon capture, which target maximal efficiency, maximal CO conversion, and the lowest net carbon intensity possible.

Furthermore, the economics of carbon capture processes drive plants to large scale to achieve the associated economies of scale and the benefits of increased process intensification. For example, Blue $H_2$ plants are often most economical at the largest-scale possible with the greatest process intensification. These projects are pushing the boundaries of the largest scale plants ever built and the ranges of the process variables being used. In particular, the operating pressures are often higher than conventional $H_2$ plants. Higher pressures allow more gas to be produced within the same-sized equipment. To improve the intensity of Blue $H_2$ plants and to produce as much product possible with the greatest degree of $CO_2$ captured, the process pressure is therefore often increased beyond levels that were previously considered typical for $H_2$ plants. These process pressures have practical limits, but pressures greater than 65 bara and up to 100 bara are now being considered. The lowest practical pressures for POX reforming processes are around 10 bara.

Catalyst manufacturers have addressed the over-reduction issues of iron-based HTS catalysts in recent years by producing non-iron-based alternative catalysts. These catalysts are simply not susceptible to over-reduction and thus can be used at much lower S/DG ratios. Typical compositions for these non-iron-based catalysts include mixtures of zinc oxide, aluminum oxide, zinc alumina spinels, and/or copper oxides with various promoters selected from Group 1A elements, Cu, Ti, Zr, or rare earth metals. However, problems remain, especially in reforming processes where the synthesis gas has a high CO concentration. The temperatures generated by the released exothermic heat, especially in the first water-gas shift, i.e. in the HTS reactor, in combination with the CO remaining in the outlet stream are a reason for metallurgical problems and metal dusting at and near the reactor outlet.

U.S. Pat. No. 8,404,156 B2 teaches that the use of non-iron-based catalysts to perform the WGS reaction for synthesis gas streams is optimized by operating with oxygen-to-carbon (O/C) molar ratios in the range of 1.69 to 2.25 at inlet temperatures of 300-400° C. and pressures of 2.3 to 6.5 MPa (23 to 65 bara). However, this prior art does not consider CO concentrations greater than 15 vol % on a dry basis, nor does it consider the implications of the adiabatic temperature rise or pressures above 65 bara in the HTS reactor.

It is an object of the present invention to provide a process and system suitable for shift-converting carbon monoxide rich synthesis gas to produce a shifted product gas with increased hydrogen concentration.

It is desirable to extend the maintenance intervals of high-temperature water-gas shift reactors and their downstream piping and reduce refurbishment events.

SUMMARY

The present invention relates to a process and system for the shift conversion of carbon monoxide and steam in a synthesis gas to produce a shifted synthesis gas having increased hydrogen concentration and carbon dioxide. The process is carried out in a water-gas shift reactor using non-iron-based high-temperature shift catalysts under conditions where traditional iron-based high-temperature shift catalysts would tend to over-reduce and possibly fail. The use of suitable non-iron based high temperature shift catalysts essentially removes the requirement of a minimum S/DG to avoid over-reduction of the catalyst. The adiabatic temperature rise due to the exothermic water-gas shift reaction is limited by adjusting the amount of steam introduced into the water-gas shift reactor with the synthesis gas.

A basic subject-matter is a process for enriching a synthesis gas in hydrogen. In the process, water is added to the synthesis gas, for example, as quench water and/or scrubber water and/or injected water, and/or in the form of steam, to form a synthesis gas stream comprising hydrogen, carbon monoxide, and steam, the synthesis gas stream having a molar ratio of steam to dry gas, S/DG, and a molar ratio of oxygen to carbon, O/C. This synthesis gas stream is introduced into a water-gas shift reactor, the synthesis gas stream having an inlet temperature, $T_{in}$, at a reactor inlet, and reacted in the water-gas shift reactor in the presence of a non-iron-based catalyst to produce a shifted synthesis gas having an increased hydrogen concentration, the shifted synthesis gas exiting the shift reactor having an outlet temperature, $T_{out}$, which is higher than the inlet temperature. The outlet temperature is controlled to remain at or below a critical temperature, $T_{crit}$, or to drop to or below the critical temperature, $T_{crit}$, by adjusting the S/DG ratio through appropriate addition of water to maintain or bring the O/C ratio above an upper O/C limit or below a lower O/C limit. In other words, the S/DG ratio is adjusted so that the O/C ratio is outside the intermediate O/C range extending from the lower O/C limit to the upper O/C limit. The outlet temperature can be controlled by suitable addition of water to stay below the critical temperature.

The invention takes into account practical limitations arising from the temperature rise associated with the exothermic WGS reaction. This temperature rise is especially high for reforming processes where the synthesis gas has a high CO concentration. Processes that can produce synthesis gas with high-CO concentrations (CO>15 vol % on a dry basis) include partial oxidation (POX), autothermal reforming (ATR), dry-reforming of methane (DRM), and steam methane reforming (SMR) at low S/C ratios. The exothermic heat released when reacting these high-CO synthesis gas streams in WGS adiabatic reactors can produce high temperatures near the exit of the reactor and in the gas exiting the reactor. These high temperatures, in conjunction with the CO remaining in the shifted synthesis gas stream, can lead to metallurgically specified limits being exceeded, for example, to metal dusting.

When examining the approaches taught in the prior art, the calculated outlet temperatures from the HTS reactors were found to exceed the recommended temperature limit of 850° F. (454° C.) for the reactor components and piping downstream when the CO concentrations exceeded 27 vol % on a dry basis. Upon further investigation of possible S/DG ratios, the unexpected result was found that either substantially increasing or decreasing the S/DG ratio was preferred to manage the exothermic temperature rise. That is, as the CO concentration continues to increase beyond 27 vol %, the optimum S/DG bifurcates into two separate desirable domains and an intermediate range that is undesirable. Therefore, the adiabatic temperature rise due to the exothermic water-gas shift reaction is limited by adjusting the amount of steam introduced with the synthesis gas to the respective reactor to either a sufficiently low O/C ratio or a sufficiently high O/C ratio rather than to the intermediate range.

The critical temperature, $T_{crit}$, may accordingly be chosen to mitigate metal dusting corrosion. For example, for carbon steel piping and other components the temperatures of concern are typically around 850° F. (450° C.). 850° F. (450° C.) may therefore be chosen as $T_{crit}$. Temperatures above 1050° F. (565° C.) or above 950° F. (510° C.) are critical also for other materials of metallurgies other than the carbon steel. 950° F. (510° C.) or even 1050° F. (565° C.) may therefore be chosen as $T_{crit}$ instead of 850° F. (450° C.).

The present invention differs from the prior art in that it considers the practical limitations of the metallurgy used for WGS reactors and how increasing the carbon monoxide levels in the feed to the WGS reactor produces higher temperatures that, in turn, lead to different desired ranges of S/DG and/or O/C ratios that are practically feasible.

The synthesis gas stream may enter the water-gas shift reactor with an inlet temperature, $T_{in}$, ranging from about 200° C. to about 400° C. Alternatively, $T_{in}$ may range from about 200° C. to about 400° C., about 210° C. to about 390° C., about 220° C. to about 380° C., about 230° C. to about 370° C., about 240° C. to about 360° C., or about 250° C. to about 350° C.

The synthesis gas may be cooled between the HTS reactor and an upstream synthesis gas formation reactor, e.g. in a steam boiler. If cooled in a steam boiler, at least a portion of the steam generated in the steam boiler can be added to the synthesis gas before being fed to the HTS reactor. Steam may be added instead or in addition from one or more other steam sources.

The water-gas shift reaction may be carried out on a sweet synthesis gas stream, i.e. as a sweet shift. Thereby, poisoning and degradation of the catalyst is reduced. Sulfur tolerant catalysts can be used. However, the process does not have to be carried out over sulfur tolerant catalysts, which extends the range of suitable catalysts. The synthesis gas stream can be low sulfur or preferably sulfur-free. The sulfur concentration in a low sulfur synthesis gas stream is less than 20 ppm or less than 10 ppm or less than 5 ppm or less than 2 ppm. The sulfur concentration in a sulfur-free synthesis gas stream is less than 1 ppm or less than 0.5 ppm.

When the process is carried out in the lower S/DG domain, where O/C<lower O/C limit, the S/DG ratio may be adjusted to keep the O/C ratio of the synthesis gas stream below 2.5. In this case, the lower O/C limit is 2.5. Lower O/C ratios allow conversion of synthesis gas streams with higher CO concentration at reactor outlet temperatures below the critical temperature. The higher the carbon monoxide concentration, the lower the lower O/C limit and the S/DG ratio and O/C ratio. The lower O/C limit may decrease to 1.69 or 1.6 or 1.5 or lower.

The lower O/C ratio can be determined for the particular carbon monoxide concentration such that the reactor outlet temperature is equal to the critical temperature. The S/DG ratio can be adjusted to maintain the O/C ratio below, but close to, the lower O/C limit to maximize the conversion rate under the outlet temperature limit condition. For example, the S/DG ratio can be adjusted to maintain the O/C ratio above 0.8 times the lower O/C limit or above 0.9 times the lower O/C limit or above 0.95 times the lower O/C limit.

When the process is carried out in the upper S/DG domain, where O/C>upper O/C limit, the S/DG ratio may be adjusted to keep the O/C ratio of the synthesis gas stream above 3.0. In this case, the upper O/C limit is 3.0. Higher O/C ratios allow conversion of synthesis gas streams with higher CO concentration at reactor outlet temperatures below the critical temperature. The higher the carbon monoxide concentration, the higher the upper O/C limit and the S/DG ratio and O/C ratio. The upper O/C limit may increase to 3.7 or 4.25 or 5.0 or higher.

The upper O/C ratio can be determined for the particular carbon monoxide concentration such that the reactor outlet temperature is equal to the critical temperature. The S/DG ratio can be adjusted to maintain the O/C ratio above, but close to, the upper O/C limit to minimize the amount of water added to the synthesis gas under the outlet temperature limit condition. The S/DG ratio may be adjusted to maintain the O/C ratio below 1.3 times the upper O/C limit or below 1.2 times the upper O/C limit or below 1.1 times the upper O/C limit.

In the lower O/C domain, the synthesis gas stream may be introduced into the water-gas shift reactor with a carbon monoxide concentration greater than 15 mol % and an S/DG ratio below 0.5. The reactor outlet temperature is thus kept below the critical temperature and metal dusting is effectively reduced or delayed. Further lowering of the S/DG ratio allows for a high-temperature shift conversion of synthesis gas streams with higher carbon monoxide concentration. The S/DG ratio may therefore be adjusted to stay below 0.34 or 0.27 or below 0.25 or even below 0.20. Adjusting the S/DG ratio to below 0.25 allows for converting synthesis gas streams having carbon monoxide concentrations greater than 30 mol % while keeping the reactor outlet temperature below the critical temperature.

In the upper O/C domain, the synthesis gas stream may be introduced into the water-gas shift reactor with a carbon monoxide concentration greater than 15 mol % and an S/DG ratio greater than 0.67. The reactor outlet temperature can thus be kept below the critical temperature and metal dusting effectively be reduced or delayed. A further increase of the S/DG ratio enables high-temperature shift conversion of synthesis gas streams with higher carbon monoxide concentration. The S/DG ratio may therefore be adjusted to stay above 0.90 or 1.0 or 1.1. Adjusting the S/DG ratio to above 1.2 allows for converting synthesis gas streams with carbon monoxide concentration of above 30 mol % while keeping the reactor outlet temperature below the critical temperature.

For example, let the lower O/C limit be 1.69 and the upper O/C limit be 4.25. These limits are suitable for carbon monoxide concentrations in the synthesis gas stream greater than 15 mol % and up to 34 mol %, on a dry basis. If the range to be avoided is widened so that the lower O/C limit is 1.5 and the upper O/C limit is 5.0, the range of carbon monoxide concentration of the synthesis gas stream can also be widened from more than 15 mol % to up to 40 mol %, on a dry basis.

The subject process is suitable for the shift conversion of synthesis gas streams having a carbon monoxide concentration of more than 15 mol % or more than 20 mol %, on a dry basis. In particular, the carbon monoxide concentration may be 30 mol % or more, on a dry basis. The carbon monoxide concentration of the synthesis gas stream may be greater than 50 mol % or even 60 mol %, on a dry basis. The invention is particularly advantageous for conversion in the case of a synthesis gas stream having a carbon monoxide concentration between 30 mol % and 60 mol %, on dry basis and including the range limits.

The water-gas shift reactor may be operated at a pressure of more than 65 bara to achieve a high conversion intensity and to realize a system for carrying out the process in a compact design.

The respective O/C limit may be selected or calculated as a function of the carbon monoxide concentration, $X_{CO}$, and/or the inlet temperature, $T_{in}$, of the synthesis gas stream. Advantageously, the O/C limit to be applied, i.e. the upper O/C limit or the lower O/C limit, is selected or calculated as a function at least of the carbon monoxide concentration, O/C ($X_{CO}$), or a function at least of the carbon monoxide concentration and the inlet temperature, O/C ($T_{in}$, $X_{CO}$). The respective O/C limit may be provided in the form of a predetermined table assigning lower O/C limits and/or upper O/C limits to different carbon monoxide concentrations of the synthesis gas stream, respectively, and selected from this table. The respective O/C limit may instead also be provided in the form of a calculation formula and calculated on this basis.

The S/DG ratio to be adjusted in relation to the respective O/C limit may be selected or calculated as a function of the carbon monoxide concentration, $X_{CO}$, and/or the inlet temperature, $T_{in}$, of the synthesis gas stream. Advantageously, the S/DG ratio to be applied is selected or calculated as a function at least of the carbon monoxide concentration, S/DG ($X_{CO}$), or a function at least of the carbon monoxide concentration and the inlet temperature, S/DG ($T_{in}$, $X_{CO}$). The S/DG ratio may be provided as a predetermined table that assigns S/DG ratios to different carbon monoxide concentrations of the synthesis gas stream, respectively, and selected from this table. It may instead also be provided in the form of a calculation formula and calculated on this basis.

When the process is carried out in the lower O/C domain, the lower O/C limit may be lowered to a reduced lower O/C limit when the carbon monoxide concentration of the synthesis gas stream increases, and the S/DG ratio may be adjusted, in this case lowered, to maintain the O/C ratio below the reduced lower O/C limit. If the carbon monoxide concentration of the synthesis gas stream increases, the lower O/C limit may be lowered and the reduced O/C limit applied by lowering the S/DG ratio accordingly in the ongoing process. However, the rule also applies to the comparison of two processes for shift converting synthesis gas streams that differ in carbon monoxide concentration, i.e., from process to process without adjustment of the S/DG ratio in the respective running process.

When the process is carried out in the upper O/C domain, the upper O/C limit may be increased to an increased upper O/C limit when the carbon monoxide concentration of the synthesis gas stream increases, and the S/DG ratio may be adjusted, in this case increased, to maintain the O/C ratio above the increased upper O/C limit. If the carbon monoxide concentration of the synthesis gas stream increases, the upper O/C limit may be increased and the increased upper O/C limit applied by increasing the S/DG ratio accordingly in the ongoing process. However, the rule also applies to the comparison of two processes for shift conversion of synthesis gas streams that differ in carbon monoxide concentration, i.e., from process to process without adjustment of the S/DG ratio in the respective running process.

The subject process may comprise determining the carbon monoxide concentration of the synthesis gas stream in mol %, vol %, or mass % and varying the S/DG ratio as a function of the determined carbon monoxide concentration. If the synthesis gas stream is introduced into the synthesis gas reactor with an O/C ratio below the lower O/C limit, the S/DG ratio may be decreased in the event of a determined increase in carbon monoxide concentration. In cases in which the synthesis gas stream is introduced into the synthesis gas reactor with an O/C ratio above the upper O/C limit, the S/DG ratio may be increased in the event of a determined increase in carbon monoxide concentration. The carbon monoxide concentration can be determined based on a computer simulation of an upstream synthesis gas formation process where the synthesis gas is formed and/or based on empirical values for carbon monoxide concentration derived from previous runs of the upstream synthesis gas formation process. In further developments, the carbon monoxide concentration is determined by analyzing the raw synthesis gas from the upstream synthesis gas formation process and/or the synthesis gas stream entering the water-gas shift reactor and/or the shifted synthesis gas stream exiting the water-gas shift reactor, e.g. by gas chromatography. When the shifted synthesis gas stream exiting the water-gas shift reactor is analyzed, the carbon monoxide concentration of the synthesis gas stream entering the shift reactor can be determined by computer simulation of the water-gas shift reaction taking place in the shift reactor.

Control of the reactor outlet temperature, $T_{out}$, may consist of adjusting the S/DG ratio at process startup based on the carbon monoxide concentration of the synthesis gas stream, and optionally monitoring the carbon monoxide concentration thereafter while the process is running and readjusting the S/DG ratio based on this monitoring.

In advantageous embodiments, the control of the reactor outlet temperature comprises the monitoring of the outlet temperature during startup and/or during the running process by means of a temperature sensor. If the process runs in the lower O/C domain, an increase in the outlet temperature may be counteracted by reducing the S/DG ratio. If the process runs in the upper O/C domain, an increase in the outlet temperature may be counteracted by increasing the S/DG ratio.

A reference temperature, $T_{ref}$, may be provided which is equal or lower than $T_{crit}$ by a safety margin $\Delta T$, i.e. $T_{ref}=T_{crit}-\Delta T$. $T_{ref}$ may serve as a maximum temperature, $T_{max}$, which must not be exceeded or only slightly exceeded, or as a target temperature, $T_{target}$, with the S/DG ratio adjusted to meet $T_{target}$. $T_{target}$ can be the reference variable of a manual control or an automated control. $T_{ref}$ may be predetermined and kept constant or changed during startup and/or the running process as a function of $T_{crit}$ and $T_{in}$ and optionally further process variables such as carbon monoxide concentration, $X_{CO}$, and/or S/DG ratio. $T_{ref}$ may for example be calculated as $T_{ref}=T_{crit}-A\cdot(T_{crit}-T_{in})$ where A is a constant chosen e.g. from the interval 0.1 to 0.2. The S/DG ratio may be adjusted as soon as the monitored outlet temperature has risen to or above the reference temperature to prevent $T_{crit}$ from being exceeded.

The outlet temperature control may be performed manually by an operator who monitors the reactor outlet temperature and adjusts the S/DG ratio by controlling one or more flow control devices capable of varying the flow rate of water added to the synthesis gas. Monitoring the reactor outlet temperature involves comparing $T_{out}$ to $T_{ref}$, where $T_{ref}$ may be used as $T_{max}$ as explained above.

In a further development, the control of the reactor outlet temperature is automated and implemented as a feed forward control (open-loop) or a feedback control (closed-loop). When implemented as a forward control, a change in the carbon monoxide concentration may be counteracted by reducing or increasing the S/DG ratio to keep the O/C ratio outside the critical intermediate range and $T_{out}$ at or below $T_{crit}$. In feedback control, the reference temperature may be provided as the target temperature, $T_{target}$, i.e. as the reference variable, and the reactor outlet temperature may be monitored and compared to $T_{target}$. The S/DG ratio may be decreased or increased as a function of this comparison to keep the O/C ratio outside the critical intermediate range.

The respective comparison in automated or manual control resides in calculating a deviation between $T_{ref}$ and $T_{out}$. The deviation may be calculated as the difference $T_{ref}-T_{out}$ or $T_{out}-T_{ref}$ or the ratio $T_{out}/T_{ref}$ or $T_{ref}/T_{out}$ or as any other measure that provides information on how close $T_{out}$ has come to $T_{ref}$ and whether it is still below or already above $T_{ref}$.

The subject process may comprise measuring a temperature representative for the outlet temperature, $T_{out}$, of the water-gas shift reactor, and comparing the temperature representative for the reactor outlet temperature with the reference temperature, $T_{ref}$, which may be provided as maximum temperature, $T_{max}$, or as target temperature, $T_{target}$. $T_{ref}$ may advantageously be chosen greater than $0.9\cdot T_{crit}$ or greater than $0.95\cdot T_{crit}$ while being at most equal to and preferably less than $T_{crit}$. The process may furthermore comprise varying the S/DG ratio in response to the result of the comparison. In a process in which the synthesis gas stream is introduced into the water-gas shift reactor at an O/C ratio below the lower O/C limit, the S/DG ratio may be reduced as the temperature representative for the reactor outlet temperature rises above the target temperature. In a process in which the synthesis gas stream is introduced into the water-gas shift reactor at an O/C ratio above the upper O/C limit, the S/DG ratio may be increased as the temperature representative for the reactor outlet temperature rises above the target temperature. The comparison and/or the subsequent S/DG adjustment can be carried out by an operator or automatically if the process is carried out under automated control.

Exceeding of $T_{crit}$ can be tolerated for a period of time because metal dusting is not an instantaneous failure limit, but rather operating at or above the critical temperature of metal dusting shortens the lifetime of the metal material in contact with the hot synthesis gas. Therefore, not every exceedance needs to be counteracted immediately. The S/DG ratio may be adjusted so that the outlet temperature, $T_{out}$, remains at or below the critical temperature, $T_{crit}$, for more than 80% or more than 90% of the operating time of the water-gas shift reactor. Exceeding $T_{crit}$ by less than 10% or less than 5%, i.e. $T_{crit}<T_{out}<1.1\ T_{crit}$ or $T_{crit}<T_{out}<1.05\cdot T_{crit}$, may be tolerated for short periods of less than 20% or less than 10% of the operating time of the water-gas shift reactor. The higher the temperature excess, the sooner an adjustment of the S/DG ratio is required.

The raw synthesis gas may be formed in a synthesis gas formation process upstream of the water-gas shift reactor, e.g. by autothermal reforming (ATR), dry-reforming of methane (DRM), or steam methane reforming (SMR) at low S/C ratios. It may be formed, in particular, by partial oxidation (POX) in a partial oxidation reactor. At least a portion of the water added to adjust the S/DG ratio may be added by injecting quench water into the raw synthesis gas of the partial oxidation.

The process may comprise removing soot and/or particulates and/or sulfur and/or other contaminants from the synthesis gas before reacting the synthesis gas stream in the water-gas shift reactor. The removal may be carried out by wet scrubbing in a scrubber disposed to receive at least a portion of the synthesis gas from the upstream synthesis gas formation reactor, such as a POX reactor, wherein the water-gas shift reactor may be disposed to receive at least a portion of the scrubbed synthesis gas from this scrubber. At least a portion of the water added to adjust the S/DG ratio may be added in the optional intermediate removal step, e.g. in the form of scrubber water.

The process may comprise an intermediate desulfurization step, particularly where the synthesis gas is formed by the partial oxidation of non-gaseous feedstock, such as coal, biomass and/or hydrocarbon liquids. In embodiments where the carbonaceous feedstock for the synthesis gas formation process is a gas, such as natural gas, refinery off-gas, other gaseous hydrocarbons, or mixtures thereof, desulfurization is preferably performed upstream of the synthesis gas formation process and the formation process uses desulfurized feed gas. However, even in cases where the carbonaceous feedstock for the synthesis gas formation process is a gas, such as natural gas, refinery off-gas, other gaseous hydrocarbons, or mixtures thereof, desulfurization can be performed as an intermediate step between the primary formation process and the shift process either instead of or in addition to upstream desulfurization. At least a portion of the water added to adjust the S/DG ratio may be added in the optional intermediate desulfurization step, e.g. in the form of scrubber water.

The synthesis gas can absorb or release water according to its water retention capacity when flowing through the respective scrubber. A scrubber can thus act as a water saturator. The amount of water absorbed in the respective scrubber can be influenced by adjusting the temperature that the syngas has at the inlet of the scrubber, which temperature can be varied within the limits of the operating temperature of the respective scrubber. The hot synthesis gas leaving the synthesis gas formation reactor can be cooled in one or more coolers en route to the scrubber to a temperature at which the syngas absorbs an amount of water as it flows through the scrubber that adjusts the water concentration of the synthesis gas leaving the scrubber to, or closer to, the S/DG ratio for the shift reactor. Accordingly, adding water and the adjusting the S/DG ratio may include or even consist of the adjustment of the temperature of the synthesis gas on its way to the water-gas shift reactor.

At least a portion of the water added to adjust the S/DG ratio may be added directly to the synthesis gas upstream of the water-gas shift reactor while the synthesis gas is fed to the water-gas shift reactor, e.g. in the form of steam. In direct addition, the water may be sprayed into a static mixer via one or more spray nozzles to bring the directly added water fully into the vapor phase and into uniform mixing with the synthesis gas before the mixture enters the water-gas shift reactor.

Adjusting the S/DG ratio may include or be achieved by only one or any two of the above three options. For example, a first portion of the water may be added to the raw synthesis gas as quench water and/or scrubber water and a second or third portion may be added directly only to adjust the S/DG ratio. Adjustment of the S/DG ratio may include or be achieved by all three of the above options.

The non-iron-based catalyst may comprise oxides of zinc, aluminum, and/or copper together with one or more promoters. The catalyst may comprise, in its active form, a mixture of zinc alumina spinel and zinc oxide. The promotor(s) may be selected from Group 1A elements, Cu, Ti, Zr, and rare earth metals, and mixtures thereof, in particular from Na, K, Rb, Cs, Cu, Ti, Zr, rare earth elements, and mixtures thereof. If the catalyst comprises oxides of zinc and/or aluminum, the Zn/Al molar ratio may range from 0.5 to 1.0. In particular, the catalyst may contain an alkali metal selected from the group consisting of Na, K, Rb, Cs and mixtures thereof, as promotor. The concentration of one or more alkali metals may be between 0.4 and 8.0 wt %, based on the weight of the oxidized catalyst.

A further subject-matter of the invention is a system for enriching a synthesis gas in hydrogen, the system comprising:

- a fluid conveyance for feeding and optionally treating the synthesis gas;
- a water supply connected to the fluid conveyance to add water to the synthesis gas to form a synthesis gas stream comprising hydrogen, carbon monoxide, and steam, the synthesis gas stream having a steam to dry gas molar ratio, S/DG, and an oxygen to carbon molar ratio, O/C;
- a water-gas shift reactor comprising a reactor inlet operatively disposed to receive the synthesis gas stream from the fluid conveyance, and a reactor outlet for a shifted synthesis gas;
- a temperature sensor for sensing a temperature representative for the outlet temperature, $T_{out}$, of the water-gas shift reactor and generating a temperature signal based on the sensed temperature; and
- one or more flow control devices capable of varying a total flow rate of water to the fluid conveyance to adjust the S/DG ratio such that the O/C ratio is maintained above an upper O/C limit or below a lower O/C limit.

The fluid conveyance comprises piping to feed the synthesis gas and may comprise a quench zone of an upstream synthesis gas formation reactor, such as the quench zone of a gasifier, and/or a separate quench unit downstream of a synthesis gas formation reactor and/or a scrubber to remove soot and/or particulates and/or sulfur and/or other contaminants and/or one or more other synthesis gas treatment devices. Desulfurization may be provided upstream of the synthesis gas formation reactor in place of, or in addition to, optional desulfurization between the synthesis gas formation reactor and the water-gas shift reactor. The water supply may comprise one or more sources of water in liquid form and/or as steam. The one or more flow control devices may be provided, for example, as control valves and/or pumps and/or compressors, which includes a combination of a pump or compressor with a control valve.

The temperature sensor may sense the temperature of the shifted synthesis gas as it exits the water-gas shift reactor or shortly thereafter or at the downstream end of the reaction zone of the water-gas shift reactor by convection contact. Instead, the temperature sensor may measure the temperature of a component within the water-gas shift reactor or an outlet pipe through which the shifted synthesis gas exits the reactor outlet. Regardless of the type and location of the measurement, the sensed temperature must allow reliable conclusions to be drawn about the actual temperature of the synthesis gas at the downstream end of the reaction zone and/or at the outlet of the reactor and/or a pipe immediately following the reactor outlet. In this sense, the measured temperature is representative for the outlet temperature.

The system may comprise an output device disposed to receive the temperature signal from the temperature sensor and configured to output an output signal that can be perceived by a system operator, the output signal being representative for the reactor outlet temperature. The output device may be formed by or comprise a visual output device and/or an audible alarm. In response to the output signal, the system operator may then manipulate one or more of the one or more flow control devices to thereby adjust the S/DG ratio such that the O/C ratio is maintained above the upper O/C limit or below the lower O/C limit. The output signal may indicate to the system operator that the reference temperature has been reached or just exceeded.

The system may provide, as an alternative to or in addition to manual control, automatic control based on a comparison of the measured temperature to the reference temperature, such as the target temperature described above with respect to the process. In such further developments, the system comprises an electronic controller for controlling the one or more flow control devices The electronic controller may be configured to calculate a temperature deviation between the sensed temperature and the reference temperature. The electronic controller may furthermore be configured to command the one or more flow control devices to vary the total flow rate of water in response to the calculated temperature deviation to adjust the S/DG ratio such that the O/C ratio is maintained above the upper O/C limit or below the lower O/C limit thereby keeping the outlet temperature at or below the reference temperature.

The invention is furthermore directed to a system for enriching a synthesis gas in hydrogen, wherein the system comprises:

- a fluid conveyance for feeding and optionally treating the synthesis gas;
- a water supply connected to the fluid conveyance to add water to the synthesis gas to form a synthesis gas stream comprising hydrogen, carbon monoxide, and steam, the synthesis gas stream having a steam to dry gas molar ratio, S/DG, and an oxygen to carbon molar ratio, O/C;
- a water-gas shift reactor comprising a reactor inlet operatively disposed to receive the synthesis gas stream from the fluid conveyance, and a reactor outlet for a shifted synthesis gas;
- a gas analyzer for determining, indirectly with the aid of computer simulation or directly, the carbon monoxide concentration, $X_{CO}$, of the synthesis gas stream and for generating a concentration signal representative for the determined carbon monoxide concentration; and
- one or more flow control devices capable of varying a total flow rate of water to the fluid conveyance to adjust the S/DG ratio such that the O/C ratio is maintained above an upper O/C limit or below a lower O/C limit.

The fluid conveyance comprises piping to feed the synthesis gas and may comprise a quench zone of an upstream synthesis gas formation reactor, such as the quench zone of a gasifier, and/or a separate quench unit downstream of a synthesis gas formation reactor and/or a scrubber to remove soot and/or particulates and/or sulfur and/or other contaminants and/or one or more other synthesis gas treatment devices. Desulfurization may be provided upstream of the synthesis gas formation reactor in place of, or in addition to, optional desulfurization between the synthesis gas formation reactor and the water-gas shift reactor. The water supply may comprise one or more sources of water in liquid form and/or as steam. The one or more flow control devices may be provided, for example, as control valves and/or pumps and/or compressors, which includes a combination of a pump or compressor with a control valve.

The gas analyzer, such as a gas chromatograph, may be disposed between an upstream synthesis gas formation reactor and the water-gas shift reactor to analyze the composition of the synthesis gas streaming from the synthesis gas formation reactor to the water-gas shift reactor. For example, the gas analyzer may be disposed near the inlet of the water-gas shift reactor to analyze the composition of the synthesis gas stream already conditioned for reaction in the water-gas shift reactor. A preferred option is to locate the gas analyzer downstream of the water-gas shift reactor, expediently near the reactor outlet, to analyze the composition of the shifted synthesis gas. The carbon monoxide concentration of the synthesis gas stream entering the water-gas shift reactor can then be determined by computerized process simulation of the reaction(s) taking place in the water-gas shift reactor. The reactor inlet temperature and/or the outlet temperature may be used in conjunction with composition information derived from the gas analyzer to determine the carbon monoxide concentration of the synthesis gas stream.

The system may comprise an output device disposed to receive the concentration signal from the gas analyzer and configured to output an output signal that can be perceived by a system operator, the output signal being representative for the carbon monoxide concentration of the synthesis gas stream entering the water-gas shift reactor. The output device may be formed by or comprise a visual output device. In response to the output signal, the system operator may then manipulate one or more of the one or more flow control devices to thereby adjust the S/DG ratio such that the O/C ratio is maintained above the upper O/C limit or below the lower O/C limit.

The system may provide, as an alternative to or in addition to manual control, automatic control based on the concentration signal from the gas analyzer. In such further developments, the system comprises an electronic controller for controlling the one or more flow control devices in response to the concentration signal from the gas analyzer. The electronic controller may be configured to calculate, in response to the concentration signal from the gas analyzer, a lower O/C limit and/or an upper O/C limit as a function of the determined carbon monoxide concentration, $X_{CO}$, or to select from a predetermined table that assigns a respective lower O/C limit and/or a respective upper O/C limit to different values for the carbon monoxide concentration. The electronic controller may furthermore be configured to determine a steam to dry gas molar ratio, S/DG, required to maintain the O/C ratio above the calculated or selected upper O/C limit or below the calculated or selected lower O/C limit. The electronic controller may be configured to command the one or more flow control devices to vary the total flow rate of water to match the required steam to dry gas molar ratio, S/DG.

In embodiments in which the gas analyzer is located downstream of the water-gas shift reactor, expediently near the reactor outlet, to analyze the composition of the shifted synthesis gas, the system may comprise a computing device configured to determine, from the composition of the shifted synthesis gas, the carbon monoxide concentration of the synthesis gas stream entering the water-gas shift reactor by process simulation of the reaction(s) occurring in the water-gas shift reactor. The computing device may be configured to use the reactor inlet temperature and/or the reactor outlet temperature in conjunction with compositional information derived from the gas analyzer to determine the carbon monoxide concentration of the synthesis gas stream entering the water-gas shift reactor. The computing device may be separate from and connected to the electronic controller unit for data transmission or may be an integral part of the electronic controller.

BRIEF DESCRIPTION OF THE DRAWINGS

The invention is explained below by way of example with reference to figures. Features disclosed there, each individually and in any combination of features, advantageously develop the subjects of the claims and also the embodiments described above.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of three or more entities means at least one of the entities in the list including any specific combination of entities in this list.

In the claims, numbers may be used to identify claimed steps (for example 1.1, 1.2, and 1.3). These numbers are used to aid in referring to the process steps and are not intended to indicate the order in which claimed steps are performed, unless and only to the extent that such order is specifically recited in the claims.

Figure 1:
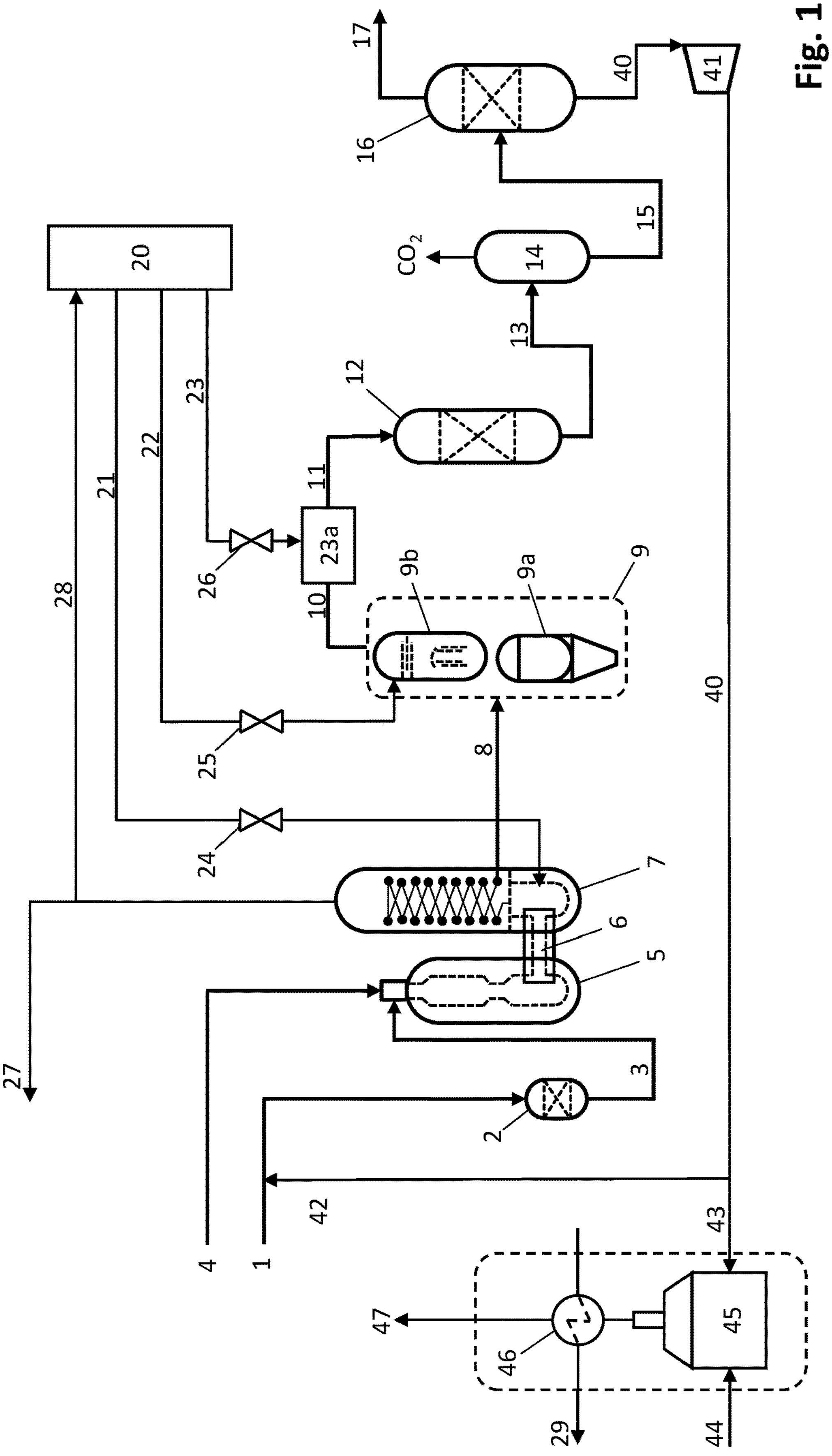
FIG. 1 shows a system and illustrates a process for enriching a synthesis gas in hydrogen by high temperature water-gas shift conversion according to a first embodiment.

FIG. 1 illustrates a first example embodiment of a process and system according to the invention. In the process a carbonaceous feed stream 1 is desulfurized in a desulfurization unit 2, e.g. by hydrodesulfurization including, but not limited to, hydrodesulfurization catalysts and sulfur-removal adsorbents. The feed stream 1 may be a gaseous feed stream. It may comprise natural gas as its major component or consist of natural gas. The desulfurized feed stream 3 is fed to a synthesis gas formation reactor 5 to produce the raw synthesis gas 6. The synthesis gas formation reactor 5 is a partial oxidation (POX) reactor. An oxygen-containing fuel gas 4, for example pure oxygen, air or oxygen enriched air, is supplied in a sub-stoichiometric amount to partially oxidize the carbonaceous components of the feed stream 3 and form a raw synthesis gas 6 containing hydrogen, $H_2$, carbon monoxide, CO, carbon dioxide, $CO_2$, and possibly other components such as nitrogen, $N_2$, and methane, $CH_4$.

The raw synthesis gas 6 is fed to a high-temperature water-gas shift (HTS) reactor 12 via a fluid conveyance for feeding, conditioning and optionally treating the raw synthesis gas 6 before it is subjected to a high-temperature water-gas shift reaction in the shift reactor 12. Conditioning may comprise cooling the synthesis gas and/or adding water to the synthesis gas and thereby adjusting the molar ratio of steam to dry gas, S/G. The HTS reactor 12 is the first shift reactor downstream of the syngas formation reactor 5, and may be followed by one or more additional shift reactors, in particular a medium and/or a low temperature water-gas shift reactor.

The fluid conveyance may comprise a cooler 7 for cooling the hot synthesis gas 6 from the reactor 5 by indirect heat exchange with water and/or direct cooling. The cooler 7 may be configured as a waste-heat boiler (WHB) or a steam superheater or a quench unit. If the cooler 7 provides indirect heat exchange, as is preferred, high pressure steam 27 can be generated for export and/or on-site power generation. The cooler 7 may provide hybrid cooling, as shown in the figure, where quench water 21 may be introduced into the syngas 6 for cooling and/or to adjust the S/DG ratio of the syngas stream.

At least a portion of the synthesis gas 6 or, if cooled in optional cooler 7, the cooled synthesis gas 8 may be treated. This treatment may comprise the removal of soot and/or particulates and/or sulfur and/or other contaminants. The fluid conveyance may comprise a treatment section 9 operatively disposed to receive at least a portion of the synthesis gas 6 or cooled synthesis gas 8 to form a cleaned synthesis gas 10. The treatment section 9 may comprise a wet scrubber 9*a* that scrubs the least a portion of the synthesis gas 6 or 8 with the aid of scrubber water 22 in liquid form or in the form of steam.

The desulfurized feed stream 3 enters the synthesis gas formation reactor 5 typically at a temperature below 900° F. (480° C.). The raw synthesis gas 6 leaves the reactor at a much higher temperature, typically within the range from 2200° F. to 2500° F. (1200° C. to 1370° C.) and may advantageously be cooled by indirect heat exchange and/or direct cooling in cooler 7 immediately downstream of reactor 5 to a temperature below 1050° F. (565° C.) or below 950° F. (510° C.) or below 850° F. (450° C.), which are temperatures of concern with respect to metal dusting. If the treatment section includes a wet scrubber such as scrubber 9*a*, the synthesis gas 6 can advantageously be cooled between the reactor 5 and the scrubber to a temperature that is still sufficiently high for the synthesis gas to absorb moisture (water) as it flows through the scrubber. The treatment section 9 may comprise a dry filter 9*b* to remove soot and/or particulate and/or sulfur and/or other contaminants. The dry filter 9*b* may replace the wet scrubber 9*a* or be provided in addition. Where the treatment section 9 comprises a desulfurization unit, it may substitute the upstream desulfurization unit 2 or be provided in addition.

Water 23 in liquid form or in the form of vapor or steam may be added directly to the synthesis gas, for example, injected directly into a feed line or sprayed in a spray device or introduced via a mixing device as the synthesis gas flows through the fluid conveyance. Water 23 may be added directly e.g. to the cleaned synthesis gas 10 to form a synthesis gas stream 11 that is subjected to the water-gas shift reaction in the HTS reactor 12. Water 23 may be sprayed into a static mixer 23*a* via one or more spray nozzles to bring the directly added water 23 fully into the vapor phase and into uniform mixing with the synthesis gas 10 before the synthesis gas stream 11 enters the HTS reactor 12.

The system may include a water supply 20 for adding quench water 21 and/or scrubber water 22 and/or direct water 23. The water supply 20 may include one or more water sources and/or a connection for importing water and/or one or more connections to one or more coolers of the system. Where the system comprises one or more coolers for cooling the synthesis gas between the synthesis gas formation reactor 5 and the HTS reactor 12 by indirect heat exchange, the water supply 20 may be operatively disposed to receive at least a portion of the steam generated by at least one of the one or more coolers. For example, the water supply 20 may be operatively disposed to receive at least a portion 28 of the steam 27 generated by the cooler 7 and configured to supply at least a portion of that steam to the synthesis gas, for example as quench water 21 and/or scrubber water 22 and/or direct water 23.

The cleaned and conditioned synthesis gas stream 11 is introduced into the HTS reactor 12 to form a shifted synthesis gas 13 with an increased $H_2$ concentration. The synthesis gas stream 11 enters the reactor 12 at a reactor inlet and exits at a reactor outlet. In the HTS reactor 12, carbon monoxide and steam react in the water-gas shift reaction $$CO+H_2O \leftrightarrow CO_2+H_2$$

under adiabatic conditions over a non-iron based catalyst.

The catalyst may comprise oxides of zinc, aluminum, and/or copper together with one or more promoters. The catalyst may expediently comprise, in its active form, a mixture of zinc alumina spinel and zinc oxide. The promotor(s) may be selected from Group 1A elements, Cu, Ti, Zr, and rare earth metals, and mixtures thereof, in particular from Na, K, Rb, Cs, Cu, Ti, Zr, rare earth elements and mixtures thereof. If the catalyst comprises oxides of zinc and/or aluminum, the Zn/Al molar ratio may range from 0.5 to 1.0. In particular, the catalyst may contain an alkali metal selected from the group consisting of Na, K, Rb, Cs and mixtures thereof, as promotor. The concentration of one or more alkali metals may be between 0.4 and 8.0 wt %, based on the weight of the oxidized catalyst.

In at least some embodiments, such as when a large amount of vapor or steam must be added to the synthesis gas 10, at least a portion of the synthesis gas 10 may be bypassed around the static mixer 23a and the HTS reactor 12. The bypassed portion of the synthesis gas 10 may be cooled and may be recombined with the shifted synthesis gas 13. Bypassing at least a portion of the synthesis gas 10 may reduce the total amount of steam required.

The system may comprise a $CO_2$ removal unit 14 operatively disposed to receive at least a portion of the shifted synthesis gas 13 and configured to remove $CO_2$ from the shifted synthesis gas 13 and form a $CO_2$ depleted synthesis gas 15. The $CO_2$ removal unit 14 may be configured as an adsorption unit containing an adsorbent for selectively adsorbing $CO_2$. The $CO_2$ removed from the shifted synthesis gas 13 may be released or transported to a $CO_2$ capture site or captured on site. The system may furthermore comprise a purification unit 16 operatively disposed to receive at least a portion of the $CO_2$ depleted synthesis gas 15 and configured to form a $H_2$ enriched product 17 and a $H_2$ depleted tail gas 40.

The tail gas 40, which comprises residual carbon monoxide and may comprise $CH_4$ and/or residual $CO_2$, or a first portion 42 of the tail gas 40 may be supplied via a compressor 41 to the synthesis gas formation reactor 5. The tail gas 40 or the tail gas portion 42 may be added to the feed stream 1 or the desulfurized feed stream 3, if an upstream desulfurization is provided.

The tail gas 40 or a second portion 43 of the tail gas 40 may be supplied via a compressor 41 to a fired heater 45 to be combusted with oxygen to generate thermal energy and produce steam 29. The oxygen may be supplied in the form of compressed air 44. Natural gas may also be supplied to the heater 45 to be burned along with the tail gas 40 or the tail gas portion 43. The hot flue gas 47 from the heater 45 may be cooled by indirect heat exchange with water in a heat exchanger 46 to form the steam 29. The steam 29 may be exported or expanded on site to generate power. As another option, water supply 20 may be operatively disposed to receive at least a portion of the steam 29 in addition to the steam 28 or in place thereof.

Figure 2:
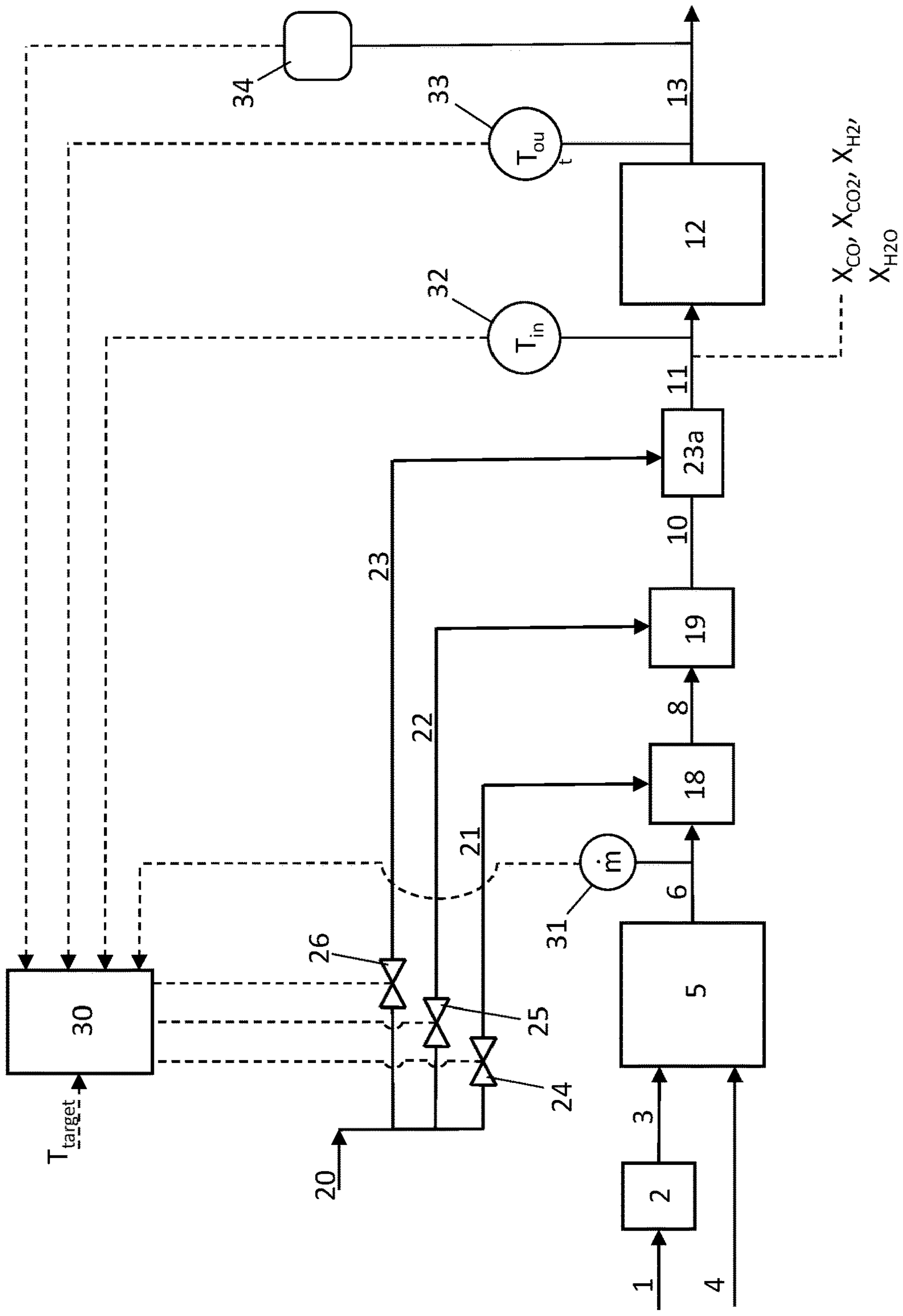
FIG. 2 shows a system and illustrates a process for enriching a synthesis gas in hydrogen by high temperature water-gas shift conversion according to a second embodiment.

FIG. 2 illustrates a second example embodiment of a process and system according to the invention. In the process a carbonaceous feed stream 1 may be desulfurized in a desulfurization unit 2, e.g. by hydrodesulfurization including, but not limited to, hydrodesulfurization catalysts and sulfur-removal adsorbents. The feed stream 1 or the desulfurized feed stream 3, if desulfurization unit 2 is present, is fed to a synthesis gas formation reactor 5 to produce a raw synthesis gas 6. The feed stream 1 may comprise coal, coke, heavy oil, tar sands, biomass, natural gas, or mixtures thereof. In principle, the feed stream 1 may consist of any hydrocarbon or mixture of hydrocarbons. The synthesis gas formation reactor 5 may be a partial oxidation (POX) reactor and an oxygen-containing fuel gas 4, for example air, may be supplied to partially oxidize the carbonaceous components of the feed stream 3 and form the raw synthesis gas 6 containing hydrogen, $H_2$, carbon monoxide, CO, carbon dioxide, $CO_2$, and possibly other components such as nitrogen, $N_2$, and methane, $CH_4$.

The raw synthesis gas 6 is fed to a high-temperature water-gas shift (HTS) reactor 12 via a fluid conveyance for feeding, conditioning and optionally treating the raw synthesis gas 6 before it is subjected to a high-temperature water-gas shift reaction in the shift reactor 12. Conditioning comprises adding water to the synthesis gas and thereby adjusting the molar ratio of steam to dry gas, S/G.

Quench water 21 may be injected into at least a portion of the raw synthesis gas 6 from the synthesis gas formation reactor 5 in a quench zone 18 of the fluid conveyance. The quench zone 18 may be disposed downstream of the reactor 5 or integrated into the reactor 5. Quenching may be performed in particular if the feed stream 1 consists of coal and/or biomass. If the feed stream 1 is a gas, such as natural gas, the raw synthesis gas 6 can be quenched, but is normally not quenched.

At least a portion of the synthesis gas 6 or, if quenched, the quenched synthesis gas 8 may be treated. The treatment may comprise the removal of soot, particulates, sulfur, and/or other contaminants of the at least a portion of the synthesis gas 6 or quenched synthesis gas 8 in a scrubber 19 of the fluid conveyance to form a cleaned synthesis gas 10. The scrubber 19 may be, for example, a scrubber that scrubs the least a portion of the synthesis gas 6 or 8 with the aid of scrubber water 22 in liquid form or in the form of steam. Where the scrubber 19 is a desulfurization unit, it may substitute the upstream desulfurization unit 2. The upstream desulfurization unit 2 may substitute intermediate desulfurization or be provided in addition thereto. A dry filter or a syngas desulfurization reactor/adsorbent vessel may also substitute wet scrubber 19 or be provided in addition thereto.

Water 23 in liquid form or in the form of steam may be added directly to the synthesis gas, for example, injected directly into a feed line or sprayed in a spray device or introduced via a mixing device as it flows through the fluid conveyance. Water 23 may be added directly e.g. to the cleaned and optionally quenched synthesis gas 10 to form a synthesis gas stream 11 that is subjected to the water-gas shift reaction in the HTS reactor 12. Water 23 may be sprayed into a static mixer 23a via one or more spray nozzles to bring the directly added water 23 fully into the vapor phase and into uniform mixing with the synthesis gas 10 before the synthesis gas stream 11 enters the HTS reactor 12.

The system may include a water supply 20 for adding quench water 21 and/or scrubber water 22 and/or direct water 23, as described with respect to the first example embodiment.

The cleaned and conditioned synthesis gas stream 11 is introduced into the HTS reactor 12 to form a shifted synthesis gas 13 with an increased $H_2$ concentration. The synthesis gas stream 11 enters the reactor 12 at a reactor inlet and exits at a reactor outlet. In the HTS reactor 12, carbon monoxide and steam react in the water-gas shift reaction under adiabatic conditions over a non-iron based catalyst, also as described above with respect to the first example embodiment.

The system may furthermore comprise a $CO_2$ removal unit, a purification unit, and a fired heater each operatively disposed and configured as described with respect to the first example embodiment.

The shift reaction may in any embodiment of the invention be carried out at a pressure of 10 bara or more, preferably at 65 bara or more. It can be performed at a pressure of up to 100 bara or even higher.

Due to the exothermic nature of the water-gas shift reaction, the temperature of the reactants and products increases along the length of the HTS reactor 10 from an inlet temperature, $T_{in}$, at the reactor inlet to an outlet temperature, $T_{out}$, at the reactor outlet. In many applications, $T_{in}$ is 270° C. or higher and may be as high as 400° C., with inlet temperatures below 370° C. or below 360° C. being preferred. Without proper control, the outlet temperature can reach 900° F. (480° C.) or 950° F. (510° C.) or 1050° F. (565° C.) or even more.

These high temperatures combined with the remaining CO in the exit stream, particularly for the first water-gas shift, i.e. the HTS reactor, may exceed the recommended limits for reactor components and/or piping near or after the reactor outlet. Such limits may result from metallurgical and/or catalyst degradation considerations. It is desirable to maintain reactor components and/or downstream piping at temperatures below a critical temperature, $T_{crit}$, i.e., the temperature of concern, by a safety margin. In terms of metallurgical considerations, such as metal dusting corrosion, 1050° F. (565° C.) can be considered a critical temperature, $T_{crit}$. To reduce the risk of metal dusting occurrence 950° F. (510° C.) may be selected instead. More conservatively, 850° F. (450° C.) may be selected as the critical temperature, $T_{crit}$.

The synthesis gas stream 11 entering the HTS reactor 12 has a molar ratio of steam to dry gas, S/DG, and a molar ratio of oxygen to carbon, O/C. Examining how the outlet temperature, $T_{out}$, depends on the carbon monoxide concentration and the water concentration of the synthesis gas stream 11, it can be seen that for a given S/DG ratio, an increase in carbon monoxide concentration is associated with an increase in $T_{out}$. For a given carbon monoxide concentration, the outlet temperature initially increases with increasing water concentration and, after exceeding a maximum temperature, decreases again with further increase in water concentration.

Figure 3:
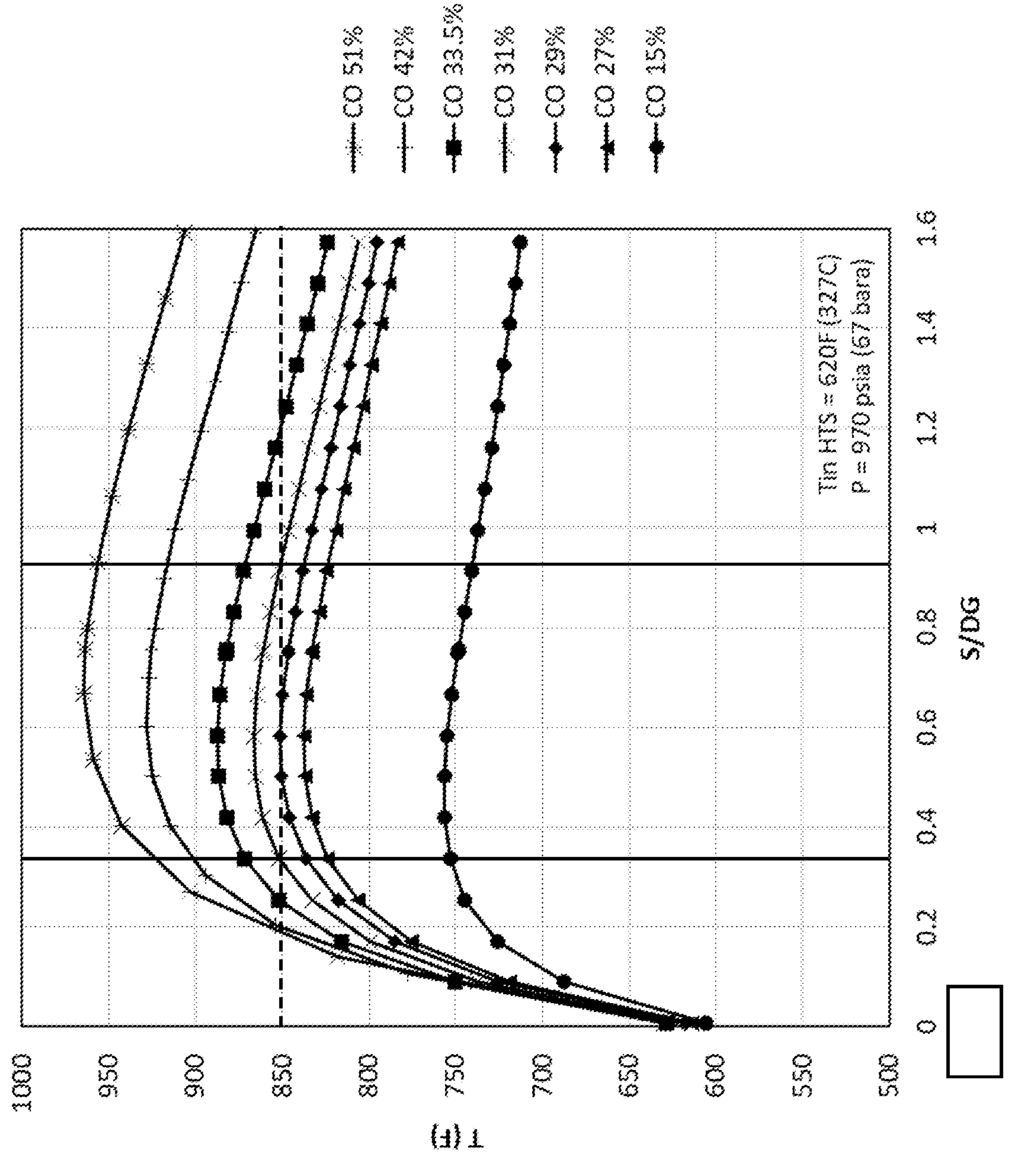
FIG. 3 shows plots of reactor outlet temperature versus steam-to-dry gas ratio for synthesis gas streams with different carbon monoxide concentration.
Figure 4:
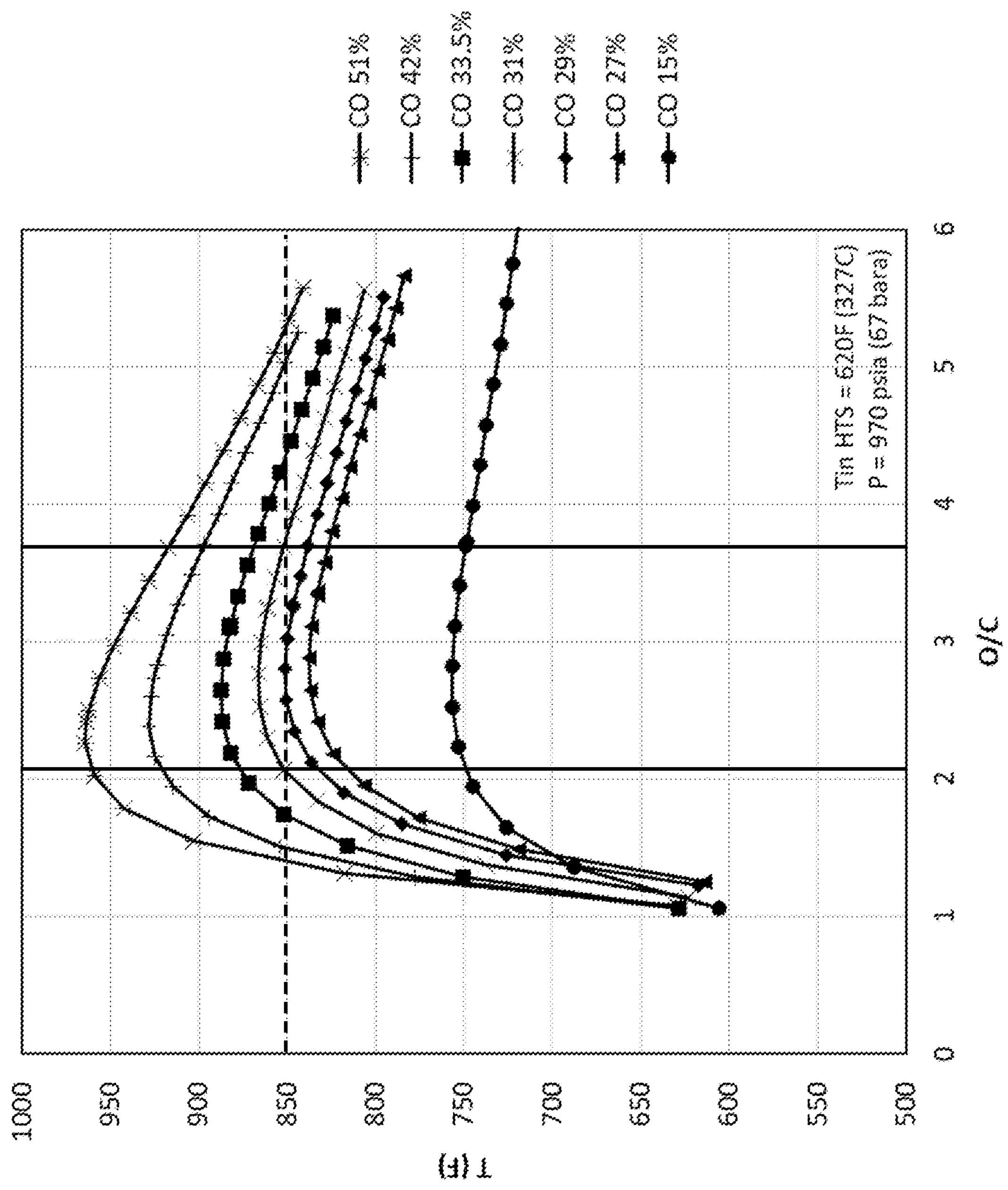
FIG. 4 shows plots of reactor outlet temperature versus oxygen-to-carbon ratio for the same synthesis gas streams.

FIG. 3 shows plots of reactor outlet temperature, $T_{out}$, versus S/DG ratio for synthesis gas streams 11 with different carbon monoxide concentration and FIG. 4 shows plots of $T_{out}$ versus O/C ratio for the same synthesis gas streams. The influence of increased carbon monoxide concentration was investigated by computational process simulation. Shown are temperature curves of seven examples of synthesis gas streams containing 15 mol %, 27 mol %, 29 mol %, 31 mol %, 33.5 mol %, 42 mol %, and 51 mol % carbon monoxide, respectively, each based on the dry gas. The carbon monoxide concentration is the main varied parameter. The critical temperature, $T_{crit}$, is drawn as a dashed level line. In the example, the critical temperature, $T_{crit}$, is conservatively chosen to be 850° F. (450° C.).

Figure 5:
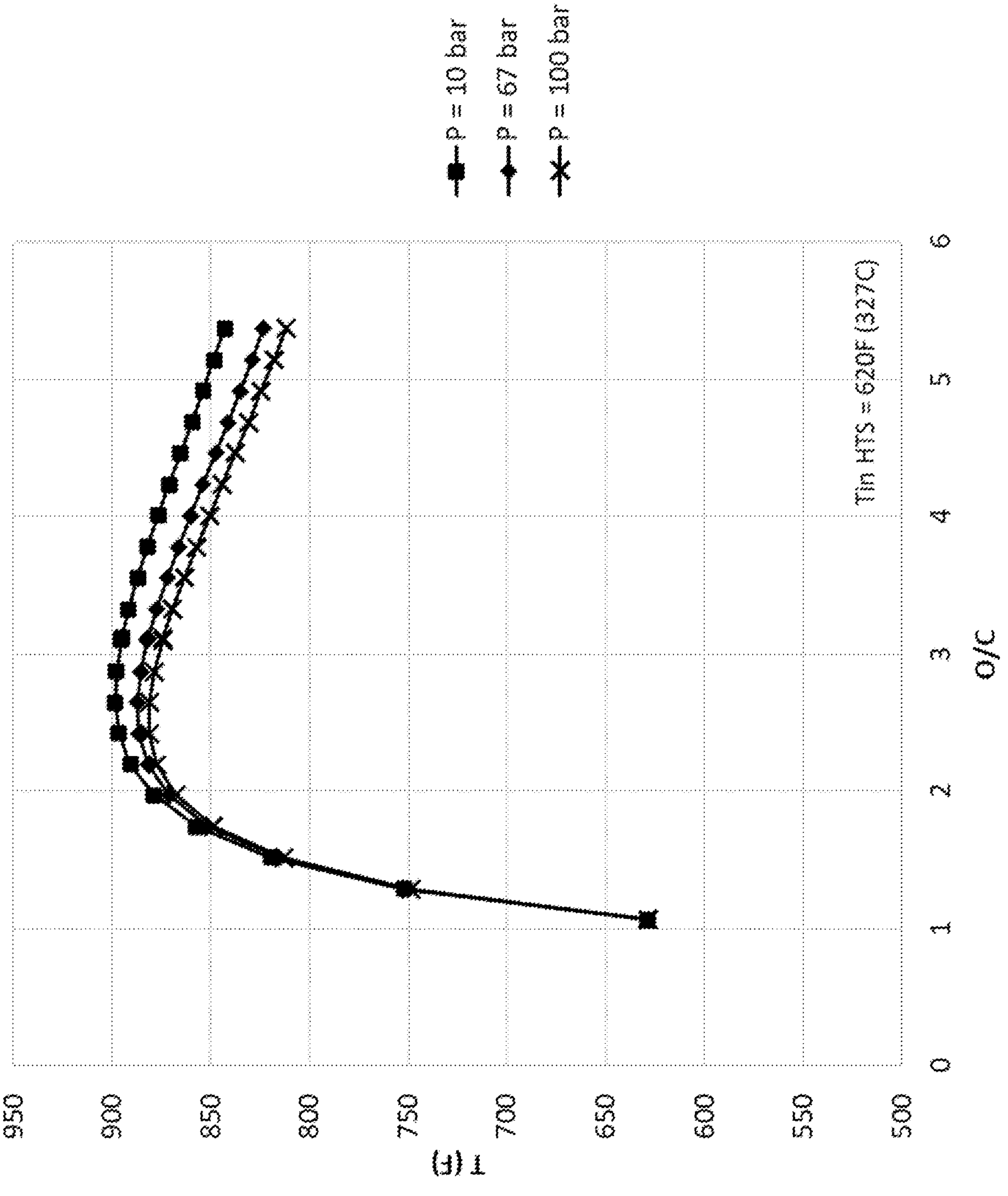
FIG. 5 shows plots of reactor outlet temperature versus oxygen-to-carbon ratio for synthesis gas streams of the same composition at different feed pressures.

FIG. 5 shows plots of $T_{out}$ versus O/C ratio for three examples of the same composition with a feed pressure of 10, 67, and 100 bar. It can be seen that feed pressure has a very weak effect on $T_{out}$.

The dry gas compositions of three of the examples, in mol %, are shown in the table below.

| | $H_2$ | CO | $CO_2$ | $CH_4$ | $N_2$ | Ar |
|---|---|---|---|---|---|---|
| Example 1 | 63.6 | 27.0 | 8.5 | 0.1 | 0.7 | 0.1 |
| Example 2 | 63.3 | 31.0 | 4.6 | 0.3 | 0.7 | 0.1 |
| Example 3 | 62.8 | 33.5 | 2.2 | 0.7 | 0.7 | 0.1 |

The plots show that the outlet temperature, $T_{out}$, increases as the carbon monoxide concentration increases. However, as the carbon monoxide concentration continues to increase beyond 27 mol %, the optimal range for the S/DG ratio as well as the O/C ratio bifurcates into two separate domains and an intermediate range, which is undesirable because of the increased rate of metal dusting. The intermediate range is delineated from the favorable lower domain and the favorable upper domain at the two points where the respective temperature curve, $T_{out}$(S/DG) or $T_{out}$(O/C), intersects the level line of Torit. For example 2, the synthesis gas stream with 31 mol % CO, the corresponding boundary lines are drawn.

For the synthesis gas stream of Example 2 with a CO concentration of 31 mol %, advantageous conditions result with respect to metal dust formation if the following ratios are maintained:

O/C<2.07 or O/C>3.7

S/DG<0.34 or S/DG>0.91

For the synthesis gas stream of Example 3 with a CO concentration of 33.5 mol %, advantageous conditions result with respect to metal dust formation if the following ratios are maintained:

O/C<1.69 or O/C>4.25

S/DG<0.25 or S/DG>1.19

The process simulation, for which the examples are only a representative sample, shows that metal dusting of metal piping and other metal components can be prevented or at least retarded for synthesis gas streams containing up to 29 mol % of carbon dioxide, on a dry basis, if the shift reaction is carried out in the lower S/DG domain, i.e. if the S/DG ratio is kept below 0.50. This keeps the O/C ratio below 2.5, which marks the lower limit of the intermediate range for the 29 mol % CO. Adjusting the S/DG ratio to even lower values, allows to increase the carbon monoxide concentration further. For example, keeping the S/DG ratio below 0.34 allows to increase the carbon monoxide concentration up to 31 mol %, on a dry basis. For example, keeping the S/DG ratio below 0.25 allows to increase the carbon monoxide concentration up to 33.5 mol %, on a dry basis. In the lower O/C and S/DG domain, the relationship between the reduction in the S/DG ratio and O/C ratio and the increase in the respective permissible carbon dioxide concentration is not linear. Any further increase in the carbon monoxide concentration can be compensated for by an ever smaller reduction in the S/DG and O/C ratio.

The shift reaction may instead be carried out in the upper domain. For carbon monoxide concentrations of up to 29 mol %, on a dry basis, metal dusting of metal piping and other metal components can be prevented or at least retarded, if the S/DG ratio is kept above 0.67. This keeps the O/C ratio above 3.0, which marks the upper limit of the intermediate range for the 29 mol % CO. Adjusting the S/DG ratio to even higher values, allows to increase the carbon monoxide concentration. For example, keeping the S/DG ratio above 0.91 allows to increase the carbon monoxide concentration up to 31 mol %, on a dry basis. For example, keeping the S/DG ratio above 1.19 allows to increase the carbon monoxide concentration up to 33.5 mol %, on a dry basis.

To prevent or at least retard metal dusting, $T_{out}$ may be controlled to remain at or below $T_{crit}$ by adding water to the synthesis gas in an appropriately adjusted amount as it flows through the fluid conveyance to the shift reactor 10. Water may be added in a metered amount, i.e., a metered total feed rate, to adjust the S/DG ratio and thereby the O/C ratio to remain below a predetermined lower O/C limit or above a predetermined upper O/C limit. For synthesis gas streams 11 with carbon monoxide concentrations above 15 mol % or above 20% mol %, a value of 2.5 can be selected as the lower O/C limit and a value of 3.0 can be selected as the upper O/C limit. Synthesis gas streams with carbon monoxide concentrations above 30 mol % may be reacted under leaner steam conditions in the lower O/C domain or under richer steam conditions in the upper domain, since the undesirable O/C intermediate range widens with increasing carbon monoxide concentration. Lowering the lower O/C limit to 2.07 or 2.0 or 1.69 or 1.6 or lower allows for reacting synthesis gas streams with carbon monoxide concentrations of more than 30 mol %. Also, increasing the upper O/C limit to 3.7 or 4.25 or 5.0 or higher allows for reacting synthesis gas streams with carbon monoxide concentrations of more than 30 mol %.

The system of any of the embodiments may accordingly comprise one or more flow control devices capable of varying a total flow rate of water to the fluid conveyance to adjust the S/DG ratio such that the O/C ratio is maintained above the upper O/C limit or below the lower O/C limit. The respective flow control device may be provided as a flow control valve. For example, a flow control device 24 may be arranged in the supply of quench water 21 to quench zone 5, if one is present, to increase or decrease the flow rate of quench water 21 for adjusting the S/DG ratio. As an alternative or in addition, a flow control device 25 may be arranged in the supply of wash water 22, if a scrubber is present, to increase or decrease the flow rate of wash water 21 for adjusting the S/DG ratio. For adjusting the S/DG ratio, a supply for direct water addition is particularly suitable, since varying the flow rate of direct water 23 does not affect any other sub-process such as scrubbing. Accordingly, a flow control device 26 may be arranged in the feed for the directly added water 23 to increase or decrease the flow rate of direct water 23 for adjusting the S/DG ratio. Any of the above control devices may serve as the sole control device for adjusting the S/DG ratio or in combination with one or more of the other respective control devices.

The total flow rate of water added to the synthesis gas, and thus the S/DG ratio, may be adjusted so that the O/C ratio is brought into either the lower or upper domain during an initial operating phase of the system and may remain constant thereafter. In basic embodiments, this can be accomplished by manually adjusting one or more of the one or more flow control devices. During this initial adjustment process, the reactor outlet temperature can be monitored and controlled to remain at or below the critical temperature by adjusting the S/DG ratio as described above. As the process continues, an adjustment can be made should the reactor outlet temperature $T_{out}$ rise to a predetermined reference temperature, $T_{ref}$, with $T_{in}<T_{ref}\leq T_{crit}$. Once this occurs, the total flow of water is reduced or increased by operating the one or more flow control devices to maintain the O/C ratio within the respective O/C domain. The following relations may hold:

$$T_{ref}>T_{in}+0.7\cdot(T_{crit}-T_{in}) \text{ or } T_{ref}>T_{in}+0.8\cdot(T_{crit}-T_{in}).$$

$T_{ref}$ is equal to or lower than $T_{crit}$ by a safety margin. Expediently, $$T_{ref}<T_{crit}-0.05\cdot(T_{crit}-T_{in}) \text{ or } T_{ref}<T_{crit}-0.1\cdot(T_{crit}-T_{in}).$$

As a rule of thumb, a safety margin of 10° C. or more and/or 30° C. or less may be selected.

The reactor outlet temperature may alternatively be controlled based on the carbon monoxide concentration, $X_{CO}$, of the synthesis gas stream 11 entering the shift reactor 12. $X_{CO}$ can be determined chromatographically during the process or data from comparable previous processes can be used. Depending on the O/C domain in which the process is carried out, the respective O/C limit may be calculated as a function of $X_{CO}$ or provided in the form of a table in which gradually increasing carbon monoxide concentrations are assigned lower O/C limits and/or upper O/C limits. From the total carbon concentration and oxygen concentration of the dry gas fraction in the synthesis gas stream 11, the S/DG ratio required to maintain the O/C ratio either below or above the respective O/C limit can be calculated, and then the total flow rate of added water can be adjusted accordingly. The total carbon and oxygen concentration of the dry gas fraction can be determined chromatographically during the process or data from comparable previous processes can be used.

The two control methods can be combined: During the start-up phase of the process, the respective O/C limit is selected from a table or calculated as a function of the carbon monoxide concentration and the S/D ratio is adjusted to maintain the O/C ratio outside the undesirable intermediate range, thereby controlling the reactor outlet temperature. Once the process has reached a steady state, the reactor outlet temperature is monitored, compared to the maximum temperature described above, and the S/DG ratio is adjusted if necessary to maintain the O/C ratio below the lower O/C limit or above the upper O/C limit.

One or more sensors may be provided, as illustrated in FIG. 2, such as a flow meter 32 for determining the flow rate, $\Delta m/\Delta t$, of the synthesis gas fed to the shift reactor 12 and generating a flow rate signal based on the determination. The flow meter 31 may be disposed at any location between the synthesis gas formation reactor 5 and the HTS reactor 12. In the example embodiment, flow meter 31 is located to measure the flow rate of the synthesis gas before water is added.

The system may comprise a temperature sensor 32 for sensing a temperature representative for the inlet temperature, $T_{in}$, of the synthesis gas stream 11 entering the shift reactor 12 and generating an inlet temperature signal based on the sensed temperature. The temperature sensor 32 may sense the inlet temperature directly in convective contact with the synthesis gas stream 11 or indirectly by sensing the temperature of the feed line or a reactor wall or reactor component near the inlet of the shift reactor 12.

In particular, to control the reactor outlet temperature, the system may comprise a temperature sensor 33 for sensing a temperature representative for the outlet temperature, $T_{out}$, of the synthesis gas stream 13 exiting the shift reactor 12 and generating an outlet temperature signal based on the sensed temperature. The temperature sensor 33 may sense the temperature directly in convective contact with the shifted synthesis gas 13 near the reactor outlet, for example while still in the reactor 12 or exiting the reactor 12 or a short distance downstream from the outlet of the reactor 12. Alternatively, the temperature sensor 33 may sense the temperature indirectly by sensing the temperature of the feed line or a reactor wall or reactor component near the outlet of the shift reactor 12.

The system may comprise a gas analyzer 34, such as a gas chromatograph, for determining the composition of the shifted synthesis gas 13 exiting the shift reactor 12 or the synthesis gas stream 11 entering the reactor 12. The gas analyzer 34 may be configured to determine the concentrations of the major constituents of the shifted synthesis gas 13 or the synthesis gas stream 11, such as the carbon monoxide concentration, $X_{CO}$, the carbon dioxide concentration, $X_{CO2}$, the hydrogen concentration, $X_{H2}$, and the water concentration, $X_{H2O}$. The gas analyzer 34 may be configured to determine the concentration of further constituents that may be present, such as methane and/or nitrogen. In principle, the gas analyzer 34 may be configured to determine only the carbon monoxide concentration, $X_{CO}$. If the gas analyzer 34 is located downstream of the shift reactor 12, as indicated in FIG. 2, the carbon monoxide concentration of the synthesis gas stream 11 entering the shift reactor 12 can be determined in a computer-aided simulation of the reaction(s) taking place in the shift reactor 12 by back-calculation from the composition of the shifted synthesis gas 13. The gas analyzer 34, if present, may be configured to generate a concentration signal representative for the respective gas component, in particular a concentration signal representative for the carbon monoxide concentration.

In further developments, an automated control may be provided, as indicated in FIG. 2. The system may comprise an electronic controller 30 for controlling the one or more flow control devices 24 to 26 in response to the temperature signal from the temperature sensor 33 and/or the concentration signal from the gas analyzer 34. "Controlling the one or more control devices 24 to 26" means controlling one or more, including all, flow control devices present to control the amount of water added to form the synthesis gas stream 11.

The electronic controller 30 may be configured to calculate a temperature deviation between the sensed temperature and the reference temperature, $T_{ref}$, which can be stored in a data memory of the controller 30 or provided by an external source. $T_{ref}$ may be kept constant or adapted during the process as a function of $T_{crit}$ and one or more process variables such as $T_{in}$ and or $X_{CO}$ and/or S/DG. The electronic controller 30 may be configured to calculate a flow rate decrease or a flow rate increase required to bring the outlet temperature closer to the target temperature, or to select such a flow rate decrease or flow rate increase from a predetermined table that assigns a respective flow rate decrease or flow rate increase to different values for the temperature deviation. The electronic controller 30, if present, is configured to command the one or more flow control devices 24 to 26 to vary the total flow rate of water, such as quench water 21 and/or wash water 22 and/or direct water 23, in response to the calculated temperature deviation to adjust the S/DG ratio such that the O/C ratio is maintained below the lower O/C limit if the shift reaction is carried out in the lower O/C domain and above the upper O/C limit if the shift reaction is carried out in the upper O/C domain.

Instead of or in addition to using the reactor outlet temperature as a controlled variable, the concentration signal from the gas analyzer 34 may be used to control the reactor outlet temperature. The electronic controller 30 may control one or more of the one or more flow control devices 24 to 26 in response to the concentration signal from the gas analyzer 34. The electronic controller 30 may be configured to calculate a lower O/C limit and/or an upper O/C limit as a function of the determined carbon monoxide concentration $X_{CO}$ in response to the concentration signal from the gas analyzer 34 and depending on the O/C range in which the HTS reactor 12 is operated, or to select the respective O/C limit from a predetermined table that assigns a respective lower O/C limit and/or a respective upper O/C limit to different values for the carbon monoxide concentration. The electronic controller may be configured to select or calculate a S/DG ratio required to maintain the O/C ratio above the upper O/C limit or below the lower O/C limit. The electronic controller 30 may furthermore be configured to command the one or more flow control devices 24 to 26 to vary the total flow rate of water to match the required S/DG ratio.

The system of the first example embodiment may comprise one or more including all of the sensors shown and described in connection with the second example embodiment and may also comprise the electronic controller 30. As far as control of the HTS reactor outlet temperature, $T_{out}$, is concerned, the process of the first example embodiment may be carried out as described for the second example embodiment.

In the basic embodiments, where the S/DG ratio is adjusted manually, an electronic controller is not required. The electronic controller 30 is an optional component of the system and process. In the basic embodiments controller 30 may be replaced with an output device, such as an optical display, for monitoring process variables, such as the outlet temperature $T_{out}$ and/or the inlet temperature $T_{in}$ and/or the carbon monoxide concentration $X_{CO}$. An operator may respond to the output as described above to keep the reactor outlet temperature below the critical temperature, $T_{crit}$.

What is claimed is:

1. A method for enriching a synthesis gas in hydrogen comprising:

adding $H_2O$ to the synthesis gas to form a synthesis gas stream comprising hydrogen, carbon monoxide, and steam, the synthesis gas stream having a steam to dry gas molar ratio, S/DG, and an oxygen to carbon molar ratio, O/C;

introducing the synthesis gas stream into a water-gas shift reactor, the synthesis gas stream having an inlet temperature, $T_{in}$;

reacting the synthesis gas stream in the water-gas shift reactor in the presence of a non-iron-based catalyst to produce a shifted synthesis gas having an outlet temperature, $T_{out}$; and controlling the outlet temperature, $T_{out}$, to remain at or below a critical temperature, $T_{crit}$, or to drop to or below the critical temperature, $T_{crit}$, by adjusting the S/DG ratio to maintain the O/C ratio below a lower O/C limit or above an upper O/C limit;

measuring a temperature representative for the outlet temperature, $T_{out}$, of the water-gas shift reactor;

providing a reference temperature, $T_{ref}$, that is equal to or less than the critical temperature, $T_{crit}$, by a safety margin and comparing the temperature representative for the outlet temperature, $T_{out}$, with the reference temperature, $T_{ref}$, and varying the S/DG ratio in response to the result of the comparison;

wherein the synthesis gas stream is introduced into the synthesis gas reactor at an O/C ratio below the lower O/C limit and the S/DG ratio is decreased if the temperature representative for the outlet temperature, $T_{out}$, rises above the reference temperature, $T_{ref}$; or wherein the synthesis gas stream is introduced into the synthesis gas reactor at an O/C ratio above the upper O/C limit and the S/DG ratio is increased if the temperature representative for the outlet temperature, $T_{out}$, rises above the reference temperature, $T_{ref}$.

2. The method according to claim 1, wherein the synthesis gas stream comprises a concentration of sulfur of less than 10 ppm.

3. The method according to claim 1, wherein the critical temperature, $T_{crit}$, is 1050° F. (565° C.).

4. The method according to claim 1, wherein the respective O/C limit is selected or calculated as a function of the carbon monoxide concentration and/or the inlet temperature, $T_{in}$, of the synthesis gas stream.

5. The method according to claim 1, wherein the lower O/C limit is 2.5 and/or wherein the upper O/C limit is 3.0.

6. The method according to claim 1, wherein the lower O/C limit is 1.69 and the upper O/C limit is 4.25; and wherein the carbon monoxide concentration of the synthesis gas stream ranges from 15 mol % to 34 mol %, on a dry basis.

7. The method according to claim 1, wherein the lower O/C limit is 1.5 and the upper O/C limit is 5.0; and wherein the carbon monoxide concentration of the synthesis gas stream ranges from 15 mol % to 50 mol %, on a dry basis.

8. The method according to claim 1, wherein the carbon monoxide concentration of the synthesis gas stream is greater than 15 mol %, on a dry basis.

9. The method according to claim 1, wherein the synthesis gas stream is introduced into the water-gas shift reactor with a carbon monoxide concentration greater than 15 mol % and an S/DG ratio less than 0.5.

10. The method according to claim 1, wherein the synthesis gas stream is introduced into the reactor with a carbon monoxide concentration greater than 15 mol % and an S/DG ratio greater than 0.67.

11. The method according to claim 1, wherein upon an increase of the carbon monoxide concentration of the synthesis gas stream the lower O/C limit is lowered to a reduced lower O/C limit and/or the upper O/C limit is increased to an increased upper O/C limit; and wherein the S/DG ratio is adjusted to maintain the O/C ratio below the reduced lower O/C limit or above the increased upper O/C limit.

12. The method according to claim 1, further comprising:

determining the carbon monoxide concentration of the synthesis gas stream; and varying the S/DG ratio as a function of the determined carbon monoxide concentration;

wherein the synthesis gas stream is introduced into the synthesis gas reactor with an O/C ratio below the lower O/C limit and an increase in the determined carbon monoxide concentration is counteracted by decreasing the S/DG ratio; or wherein the synthesis gas stream is introduced into the synthesis gas reactor with an O/C ratio above the upper O/C limit and an increase in the determined carbon monoxide concentration is counteracted by increasing the S/DG ratio.

13. The method according to claim 1, wherein at least a portion of the water is added directly to the synthesis gas upstream of the water-gas shift reactor while the synthesis gas is fed to the water-gas shift reactor and/or at least a portion of the water is added by quenching and/or scrubbing with water.

14. The method according to claim 1, wherein the non-iron-based catalyst comprises in its active form a mixture of zinc alumina spinel and zinc oxide in combination with a promoter selected from the group consisting of Na, K, Rb, Cs, Cu, Ti, Zr, and mixtures thereof.

15. The method according to claim 1, wherein the non-iron-based catalyst has a Zn/Al molar ratio between 0.5 and 1.0 and a concentration of alkali metal selected from the group consisting of Na, K, Rb, Cs, and mixtures thereof, between 0.4 and 8.0 wt % based on the weight of the oxidized catalyst.

16. The method according to claim 1, wherein Tin ranges from 270° C. to 400° C.

* * * * *